(12) United States Patent
 Mingas

(10) Patent No.: US 11,788,582 B2
(45) Date of Patent: Oct. 17, 2023

(54) TORQUE LIMITER FOR A DRIVETRAIN

(71) Applicant: Schaeffler Technologies AG & Co. KG, Herzogenaurach (DE)

(72) Inventor: Constantin Mingas, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 546 days.

(21) Appl. No.: 16/644,625

(22) PCT Filed: Sep. 12, 2018

(86) PCT No.: PCT/DE2018/100769
§ 371 (c)(1),
(2) Date: Mar. 5, 2020

(87) PCT Pub. No.: WO2019/052603
PCT Pub. Date: Mar. 21, 2019

(65) Prior Publication Data
US 2021/0062870 A1  Mar. 4, 2021

(30) Foreign Application Priority Data

Sep. 15, 2017 (DE) .......................... 102017121437.2

(51) Int. Cl.
*F16D 7/02* (2006.01)
*F16F 15/129* (2006.01)

(52) U.S. Cl.
CPC .......... *F16D 7/025* (2013.01); *F16F 15/1297* (2013.01)

(58) Field of Classification Search
CPC ........ F16D 7/025; F16D 7/027; F16D 43/215; F16D 43/216; F16D 7/028; F16D 43/218;
(Continued)

(56) References Cited

U.S. PATENT DOCUMENTS 4,640,402 A * 2/1987 Hartig ..................... F16D 67/00
192/214.1
4,741,721 A * 5/1988 Nishimura ............ F16F 15/129
192/214.1
(Continued)

FOREIGN PATENT DOCUMENTS

CN  102414467 A  4/2012
CN  102472361 A  5/2012
(Continued)

*Primary Examiner* — Josh Skroupa

(57) ABSTRACT

A torque limiter for a drivetrain includes a friction lining, a drive side, and an output side, connected to the drive side by the friction lining until a limiting torque is reached. The torque limiter also has a first friction surface on the drive side or the output side, a first contact surface between the friction lining and the first friction surface, a second friction surface on the other of the drive side or the output side, and a second contact surface between the friction lining and the second friction surface. The first contact surface has a first mean friction radius and the second contact surface has a second mean friction radius, different than the first mean friction radius. When the limiting torque is exceeded, the friction lining is positioned slidingly on the first friction surface, and the friction lining is frictionally connected to the second friction surface.

7 Claims, 3 Drawing Sheets

(58) Field of Classification Search
CPC .. F16F 15/1297; F16F 15/1397; F16F 15/129; F16F 15/1292; F16F 15/1295; F16F 15/139; F16F 15/1392; F16F 15/1395
USPC ............ 464/45, 46, 68.4, 68.41, 47, 48
See application file for complete search history.

(56) References Cited

U.S. PATENT DOCUMENTS

| | | | | |
|---|---|---|---|---|
| 4,856,638 | A * | 8/1989 | Roth | F16F 15/129 |
| | | | | 192/214.1 |
| 5,505,288 | A * | 4/1996 | Tomiyama | F16F 15/129 |
| | | | | 464/68.4 |
| 6,119,839 | A * | 9/2000 | Jackel | F16F 15/13476 |
| | | | | 192/208 |
| 7,192,354 | B2 * | 3/2007 | Uehara | F16F 15/1292 |
| | | | | 464/68.4 |
| 2010/0224459 | A1 * | 9/2010 | Saeki | F16D 7/025 |
| | | | | 192/56.1 |
| 2011/0244967 | A1 * | 10/2011 | Usui | F16F 15/1207 |
| | | | | 464/68.4 |
| 2012/0264522 | A1 * | 10/2012 | Saeki | F16D 13/70 |
| | | | | 464/46 |
| 2013/0029771 | A1 * | 1/2013 | Saeki | F16F 15/129 |
| | | | | 464/45 |
| 2014/0094321 | A1 * | 4/2014 | Miyagawa | F16F 15/1297 |
| | | | | 464/46 |

FOREIGN PATENT DOCUMENTS

| | | | | |
|---|---|---|---|---|
| DE | 4239610 | A1 * | 5/1993 | ......... F16F 15/129 |
| DE | 102007000648 | A1 | 5/2008 | |
| DE | 112013007052 | T5 | 3/2016 | |
| EP | 1176339 | B1 | 1/2002 | |
| EP | 1936218 | A2 | 6/2008 | |
| EP | 2226528 | A2 | 9/2010 | |
| EP | 2233779 | A2 | 9/2010 | |
| FR | 2827024 | A1 * | 1/2003 | ......... F16F 15/1236 |
| JP | H10318301 | A | 12/1998 | |
| JP | 2002045583 | A | 2/2002 | |
| JP | 2004019834 | A | 1/2004 | |
| JP | 2009041737 | A | 2/2009 | |
| JP | 5494891 | B2 | 5/2014 | |

* cited by examiner

TORQUE LIMITER FOR A DRIVETRAIN

CROSS-REFERENCE TO RELATED APPLICATIONS

This application is the United States National Phase of PCT Appln. No. PCT/DE2018/100769 filed Sep. 12, 2018, which claims priority to German Application No. DE102017121437.2 filed Sep. 15, 2017, the entire disclosures of which are incorporated by reference herein.

TECHNICAL FIELD

The disclosure relates to a torque limiter for a drivetrain, in particular for a drivetrain of a motor vehicle. The drivetrain is in particular a drivetrain for a hybrid vehicle. The drivetrain has in particular a first drive unit (for example an internal combustion engine) and a second drive unit (for example an electric machine) which can be connected with one another in a torque-transmitting manner via the torque limiter, or can be separated from one another.

BACKGROUND

Such torque limiters are known. With them, slipping of the friction lining is enabled on only one of two friction surfaces when a limiting torque is exceeded. Slipping is prevented on the other friction surface. This targeted fixing of one of the two friction surfaces on the drive side or the output side is necessary in order to ensure little variation of the targeted slip torque (when the limiting torque is exceeded). To this end, a special material pairing is provided on the friction surface intended for the slipping.

The fixing of the friction linings on one of the drive side and output side is ensured in known torque limiters by means of positive connections between friction surface and friction lining (for example by riveting or by profilings that extend into one another. Alternatively, the friction lining is materially bonded to the friction surface by cementing).

This positive or material fixing of the friction lining on one of the friction surfaces necessitates increased assembly or production effort, and brings about higher costs.

SUMMARY

The disclosure relates to a torque limiter for a drivetrain, having at least one axis of rotation extending in an axial direction, as well as a drive side and an output side. The drive side and the output side are connected with one another (during operation of the torque limiter) in a torque-transmitting manner through at least one friction lining and under a pre-stress acting in the axial direction, at least until a limiting torque acting in a circumferential direction is reached. When the limiting torque is exceeded, the at least one friction lining is disposed slidingly on a first friction surface which is present only on one of the drive side and output side. At the same time, the at least one friction lining is (furthermore) frictionally connected to a second friction surface which is present on the other of the drive side and output side. A first contact surface between the at least one friction lining and the first friction surface has a mean first friction radius, and a second contact surface between the at least one friction lining and the second surface has a mean second friction radius which differs from the mean first friction radius.

The mean friction radius is usually present in the middle of a contact surface between the friction lining and the friction surface, with the middle being positioned in a radial direction, spaced equidistant from an outer radius of the contact surface and an inner radius of the contact surface.

The design of the contact surfaces with different mean radii makes a predetermined slip possible (that is, a twisting of the friction lining in the circumferential direction relative to the friction surface) on a (predetermined) friction surface (namely on the first friction surface), while the other (second) friction surface continues to be frictionally connected to the friction lining (and thus does not slip).

In particular, the first friction surface is made of a premium steel.

In particular, the mean first friction radius is smaller than the mean second friction radius. Preferably the mean first friction radius is at last 1%, in particular at least 2%, preferably at least 5% smaller than the mean second friction radius.

The difference in the mean friction radii may be realized by at least one cutout. The at least one cutout is realized on the at least one friction lining to the friction surface and/or on at least one friction surface, the contact surface being reduced by the cutout.

The at least one cutout is preferably provided only on the at least one friction lining to the second friction surface, and/or on the second friction surface. In this way, the first contact surface, which is intended for slipping, can continue to be designed as large as possible, so that abrasion and thus wear always occurs on the larger of the two contact surfaces (here on the first contact surface, and not on the second contact surface, which is reduced by the cutout).

The at least one cutout is located in particular inward in a radial direction from the mean first friction radius.

The at least one cutout is preferably made continuously in the circumferential direction.

In particular, the contact surface reduced by the cutout extends in the circumferential direction at a constant first radius, with one edge bordering on the cutout.

The contact surfaces extend in the radial direction in particular between an outer radius and an inner radius. A mean friction radius may be reduced by a cutout, by locating the cutout outside of the contact surface in the radial direction and making the outer radius smaller (relative to the outer radius of the other contact surface of the friction lining). A mean friction radius may be reduced by a cutout, by locating the cutout inside of the contact surface in the radial direction and enlarging the inner radius (relative to the inner radius of the other contact surface of the friction lining).

The cutout is positioned in particular so that the second contact surface is reduced, and thus the mean second friction radius is enlarged relative to the mean first friction radius.

At least one mean friction radius may be increased or reduced (additionally) by at least one elevation located within a contact surface on a friction surface and extending at least in the axial direction to the friction lining. This elevation is implemented in particular continuously in the circumferential direction (and running along a constant second radius). A contact pressure between friction lining and friction surface can be intensified by the elevation, making it possible to change the mean friction radius.

The elevation may be realized by a bead on the component forming the friction surface.

The at least one friction lining forms an exclusively frictional connection with the drive side and with the output side, at least in relation to the circumferential direction, until the limiting torque is reached. So there are here specifically no connections acting in the circumferential direction provided, either material (for example by cementing) or positive (for example by intermeshing profiles or by rivets). The proposed elevation in particular does not form a positive connection acting in the circumferential direction.

In particular, the friction linings are thus positioned between the drive side and the output side or between the friction surfaces, and are fixed relative to the axis of rotation by the pre-stressing of a bias spring. This makes it possible to realize a simple assembly.

The torque limiter may have at least a first friction lining and a second friction lining, between which the input side or the output side is positioned.

The torque limiter is implemented in particular together with a known torsion damper. The torsion damper serves to damp torque fluctuations. In particular, the torsion damper is positioned inside of the at least one friction lining in a radial direction.

The at least one friction lining, the axis of rotation, and the drive side and output side are arranged in particular coaxially to each other.

A drivetrain for a motor vehicle is also proposed, having at least a first drive unit (for example an internal combustion engine) for providing a first drive torque, and a second drive unit (for example an electric machine) for providing a second drive torque. The first drive unit and the second drive unit can be connected with one another in a torque-transmitting manner by means of a torque limiter described above, and can be separated from one another when a limiting torque is reached.

Let it be noted, as a precaution, that the ordinal numbers ("first," "second," . . . ) used here serve primarily (only) to differentiate among a plurality of similar objects, values or processes, so that in particular they do not necessarily indicate any dependence and/or sequential order of these objects, values or processes relative to each other. If a dependence and/or sequential order should be necessary, this must be stated here specifically or must be obvious to a person skilled in the art when studying the concretely described design.

BRIEF DESCRIPTION OF THE DRAWINGS

The disclosure as well as the technical environment will be explained in greater detail below on the basis of the figures. It should be pointed out that the disclosure is not to be limited by the exemplary embodiments shown. In particular, it is also possible, unless explicitly shown otherwise, to extract partial aspects of the circumstances explained in the figures and to combine them with other components and insights from the present description and/or figures. In particular, it must be pointed out that the figures, and especially the depicted size proportions, are only schematic. Like reference labels designate like objects, so that explanations from other figures may be cited in addition, as appropriate. In the figures.

DETAILED DESCRIPTION

Figure 1:
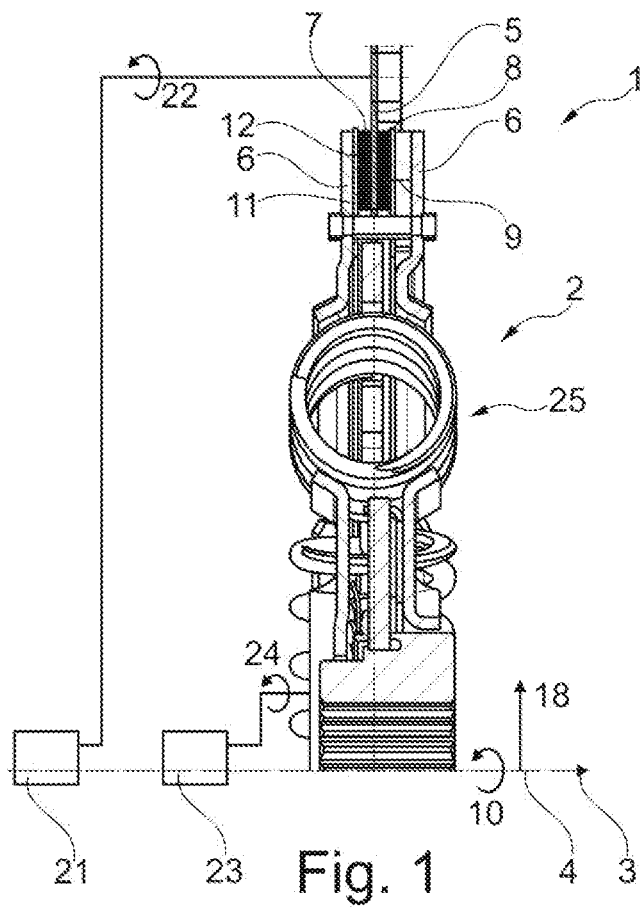
FIG. 1 shows a first variant embodiment of a known torque limiter in a drivetrain, in a side cross sectional view.

FIG. 1 shows a first variant embodiment of a known torque limiter 1 in a drivetrain 2, in a side cross sectional view. The drivetrain 2 has a first drive unit 21 (for example an internal combustion engine) for providing a first drive torque 22, and a second drive unit 23 (for example an electric machine) for providing a second drive torque 24. The first drive torque 22 acts directly on the drive side 5 of the torque limiter 1. The second drive torque 24 acts directly on the output side 6 of the torque limiter. The output side 6 may further be connected in a torque-transmitting manner to a transmission (not shown here). A torsion damper 25 is positioned on the output side 6 inside of the friction linings 7, 8 in a radial direction 18. The first drive unit 21 and the second drive unit 23 can be connected with one another in a torque-transmitting manner by means of the torque limiter 1, and can be separated from one another when a limiting torque is reached.

The torque limiter 1 has an axis of rotation 4 extending in an axial direction 3, as well as a drive side 5 and an output side 6, which are connected with one another in a torque-transmitting manner through two friction linings 7, 8 and under a pre-stress 9 acting in the axial direction 3, at least until a limiting torque acting in a circumferential direction 10 is reached. The output side 5 is positioned between the first friction lining 7 and the second friction lining 8. The output side 6 here includes two plates, between which the friction linings 7, 8 and the drive side 5 are positioned. Positioned between one plate of the output side 6 and one friction lining 7, 8 (here the second friction lining 8) is a bias spring, which produces the requisite stress 9 for the frictional connection.

During operation of the drivetrain 2, when the limiting torque is exceeded, the friction linings 7, 8 are disposed slidingly on a first friction surface 11 which is present only on one of the drive side 5 and output side 6 (here on the output side 6), and is frictionally connected to a second friction surface 12 which is present on the other of the drive side 5 and output side 6 (here on the drive side 5).

The friction linings 7, 8, the axis of rotation 3, and the drive side 5 and output side 6 are arranged coaxially to each other.

Figure 2:
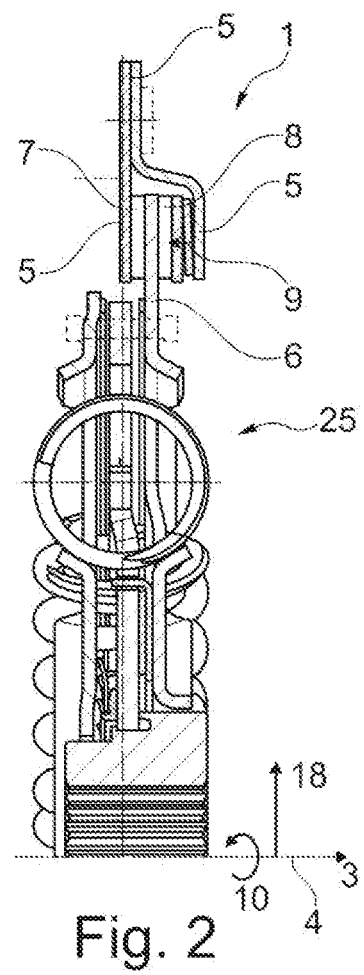
FIG. 2 shows a second variant embodiment of a known torque limiter in a side cross sectional view.

FIG. 2 shows a second variant embodiment of a known torque limiter 1 in a side cross sectional view. See the comments on FIG. 1. In contrast to the first variant embodiment, in the second variant embodiment the output side 6 is positioned between the first friction lining 7 and the second friction lining 8. The drive side 5 here includes two plates, between which the friction linings 7, 8 and the output side 6 are positioned. Positioned between one plate of the drive side 5 and one friction lining 7, 8 (here the second friction lining 8) is a bias spring, which produces the requisite stress 9 for the frictional connection.

Figure 3:
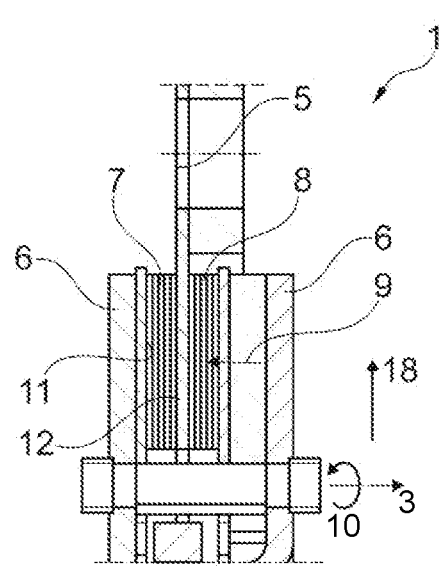
FIG. 3 shows a detail of FIG. 1.

FIG. 3 shows a detail of FIG. 1. See the comments on FIG. 1. When the limiting torque is exceeded, the friction linings 7, 8 are disposed slidingly on the first friction surface 11 (the latter is positioned on the output side 6 here). The friction linings 7, 8 continue to be connected frictionally to the second friction surface 12 (positioned on the drive side 5 here). This is realized in the variant embodiments shown in FIGS. 1 through 3 by a material connection (for example by cementing) or a positive connection (for example intermeshing profiles or rivets) between the second friction surface 12 and the respective friction lining 7, 8.

Figure 4:
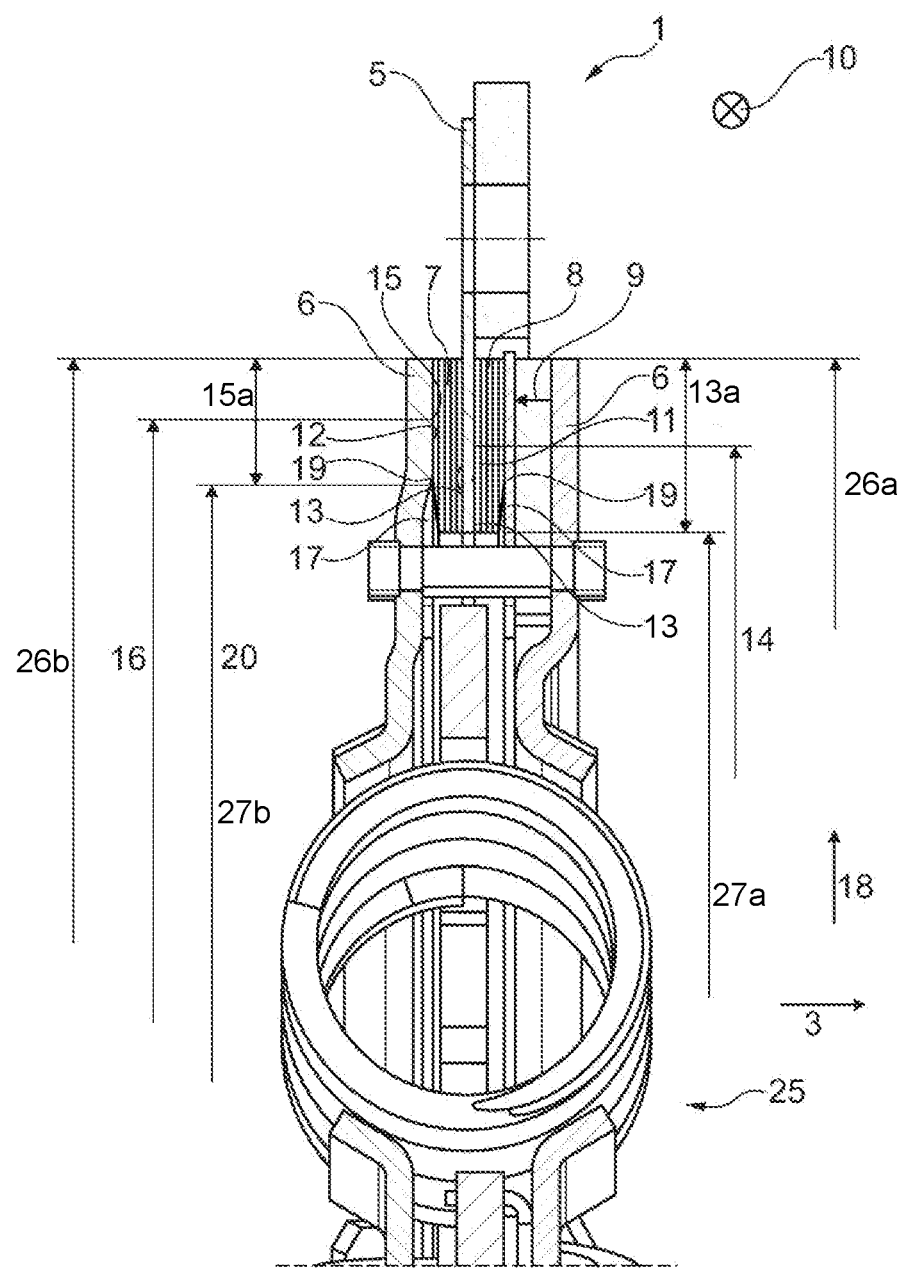
FIG. 4 shows a torque limiter having differing mean friction radii, in a side cross sectional view.

FIG. 4 shows a torque limiter 1 having differing mean friction radii 14, 16, in a side cross sectional view. See the comments on FIGS. 1 and 3. In contrast to the known first embodiment variant depicted there, here a cutout 17 is provided in the area of the second contact surface 15.

A first contact surface 13 between each friction lining 7, 8 and the first friction surface 11 has a mean first friction radius 14, and a second contact surface 15 between each friction lining 7, 8 and the second friction surface 12 has a mean second friction radius 16 which differs from the mean first friction radius 14.

The mean friction radius 14, 16 in each case is present in the middle of a respective radial extent 13a, 15a of contact surface 13, 15 between the friction lining 7, 8 and the friction surface 11, 12, with the middle being positioned in a radial direction 18, spaced equidistant from a respective outer radius 26a, 26b of the contact surface 13, 15 and an inner radius 27a, 27b of the contact surface 13, 15.

The difference in the mean friction radii 14, 16 is realized by the cutout 17. The cutout 17 is realized on each friction lining 7, 8 to the second friction surface 12, and simultaneously on the second friction surface 12, the second contact surface 15 being reduced by the cutout 17. The cutout 17 is located inward in a radial direction 18 from the mean first friction radius 14. The second contact surface 15, reduced by the cutout 17, extends in the circumferential direction 10 at a constant first radius 20, with one edge 19 bordering on the cutout 17.

The contact surfaces 13, 15 extend in the radial direction 18 between respective outer radii 26a, 26b and respective inner radii 27a, 27b. The mean second friction radius 16 is enlarged by the cutout 17, by locating the cutout 17 inside of the second contact surface 15 in the radial direction 18 enlarging the inner radius 27b (relative to the inner radius 27a of the first contact surface 13 of the respective friction lining 7, 8).

Figure 5:
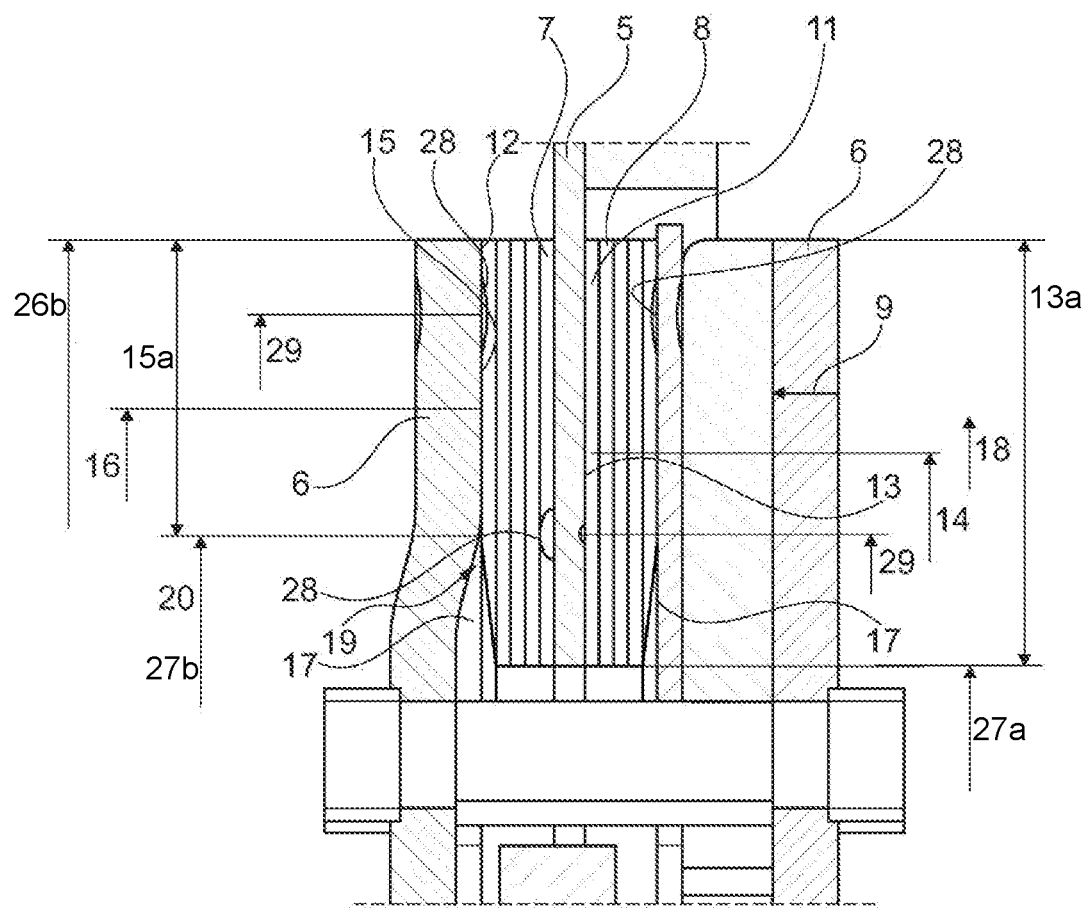
FIG. 5 shows a detail of FIG. 4.

FIG. 5 shows a detail of FIG. 4. See the comments on FIG. 4. Besides the cutouts 17, elevations 28 are also depicted.

A mean friction radius 14, 16 is increased or reduced by an elevation located within a contact surface 13, 15 on a friction surface 11, 12 and extending at least in the axial direction 3 to the friction lining 7, 8. This elevation 28 is implemented continuously in the circumferential direction 10 (and running along a constant second radius 29). A contact pressure between friction lining 7, 9 and friction surface 11, 12 is intensified by the elevation 28, making it possible to change the mean friction radius 14, 16.

The elevation 28 is realized here by a bead on the component (plate of the drive side 5 or of the output side 6) forming the friction surface 11, 12.

REFERENCE NUMERALS 1 torque limiter
2 drive train
3 axial direction
4 axis of rotation
5 drive side
6 output side
7 first friction lining
8 second friction lining
9 pre-stress
10 circumferential direction
11 first friction surface
12 second friction surface
13 first contact surface
13a radial extent of first contact surface 13
14 first friction radius
15 second contact surface
15a radial extent of second contact surface 15
16 second friction radius
17 cutout
18 radial direction
19 edge
20 first radius
21 first drive unit
22 first drive torque
23 second drive unit
24 second drive torque
25 torsion damper
26a outer radius (first contact surface 13)
26b outer radius (second contact surface 15)
27a inner radius (first contact surface 13)
27b inner radius (second contact surface 15)
28 elevation
29 second radius

The invention claimed is:

1. A torque limiter for a drivetrain, comprising:
an axis of rotation extending along an axial direction;
a friction lining under a pre-stress acting in the axial direction, the friction lining comprising a cutout;
a drive side;
an output side connected to the drive side by the friction lining in a torque-transmitting manner until a limiting torque is reached;
a first friction surface on a one of the drive side or the output side;
a first contact surface between the friction lining and the first friction surface, the first contact surface comprising a first mean friction radius;
a second friction surface on the other of the drive side or the output side; and,
a second contact surface between the friction lining and the second friction surface, the second contact surface comprising a second mean friction radius, different than the first mean friction radius, wherein:
the cutout reduces the second contact surface and increases the second mean friction radius; and
when the limiting torque is exceeded:
the friction lining slides on the first friction surface; and
the friction lining is frictionally fixed to the second friction surface.

2. The torque limiter of claim 1, wherein the first mean friction radius is smaller than the second mean friction radius.

3. The torque limiter of claim 2, wherein the first mean friction radius is at least 1% smaller than the second mean friction radius.

4. The torque limiter of claim 1, wherein the cutout is located radially inward of the first mean friction radius.

5. The torque limiter of claim 1, wherein the cutout is continuous in a circumferential direction.

6. The torque limiter of claim 1, wherein the second contact surface extends in a circumferential direction at a constant first radius, the second contact surface comprising an edge bordering on the cutout.

7. A drivetrain for a motor vehicle, comprising:
the torque limiter of claim 1;
a first drive unit for providing a first drive torque; and
a second drive unit for providing a second drive torque, connected to the first drive unit in a torque-transmitting manner by the torque limiter.

* * * * *